(12) United States Patent
Beaulieu et al.

(10) Patent No.: US 6,182,120 B1
(45) Date of Patent: Jan. 30, 2001

(54) METHOD AND SYSTEM FOR SCHEDULING QUEUED MESSAGES BASED ON QUEUE DELAY AND QUEUE PRIORITY

(75) Inventors: Cesca Beaulieu; Jean-Claude Dispensa, both of Saint-Jeannet (FR)

(73) Assignee: International Business Machines Corporation, Armonk, NY (US)

(*) Notice: Under 35 U.S.C. 154(b), the term of this patent shall be extended for 0 days.

(21) Appl. No.: 09/152,144

(22) Filed: Sep. 11, 1998

(30) Foreign Application Priority Data

Sep. 30, 1997 (EP) .................................................. 97480067

(51) Int. Cl.$^7$ ........................... G06F 15/16; G06F 15/173
(52) U.S. Cl. ..................... 709/207; 709/103; 709/107; 709/200; 709/229; 709/232; 709/240; 710/29; 710/40; 710/54; 710/60; 710/244; 710/263
(58) Field of Search .................................. 709/103, 200, 709/207, 107, 240, 243, 244, 232, 229; 710/60, 54, 29, 40, 263, 244

(56) References Cited

U.S. PATENT DOCUMENTS

| | | | |
|---|---|---|---|
| 4,084,228 | * 4/1978 | Dufond et al. | 709/103 |
| 5,012,409 | * 4/1991 | Fletcher et al. | 709/107 |
| 5,469,571 | * 11/1995 | Bunnell | 709/103 |
| 5,544,318 | * 8/1996 | Schmitz et al. | 709/207 |
| 5,892,900 | * 4/1999 | Ginter et al. | 713/200 |
| 6,061,709 | * 5/2000 | Bronte | 709/103 |

* cited by examiner

Primary Examiner—Mark H. Rinehart
Assistant Examiner—William C. Vaughn, Jr
(74) Attorney, Agent, or Firm—Daniel E. McConnell (57) ABSTRACT

Queue processing mechanism in which queued messages are processed based on combination of queue delay and queue priority. A scheduler dequeues the highest priority non-empty Microcode Input Queue (MIQ) to serve the queued messages. If there is no critical queue, meaning that the maximum aging of one or more queues has not been reached, the critical state is not entered. A static weight for each queue is then tested to determine if there is still a message to be processed from the corresponding MIQ. Messages are dequeued from the same MIQ until the static weight is reached. The next MIQ is then served etc., until the queue of the lowest priority level is served. If the critical phase is entered, the status of the normal state is stored for later return and the MIQs in critical state are dequeued according to their critical weights. If other MIQs appear to be critical, they are served in the order of their critical priorities (or weights). The critical queues are dequeued sequentially according to their critical weight. If no critical MIQ is left, the scheduler exits from this critical state and loops back to the normal state that it previously exited. Normal state processing continues until the next critical state occurs.

4 Claims, 6 Drawing Sheets

STEP 7

| Nb of Msg | 1 | 0 | 1 | 2 | 0 | 0 |
|---|---|---|---|---|---|---|
| Stat.Ni | . | . | . | . | . | . |
| Crit.Ni | 3 | . | . | . | . | . |
| Cur.Ni | 2 | 0 | 0 | 0 | 0 | 0 |
| DelMaxi | . | . | . | . | . | . |
| Dorm.i | 0 | . | 2 | 1 | . | . |

HDW_ST: 1 0 1 1 0 0    WGH_ST: 1 0 0 0 0 0
ACT_ST: 1 0 0 0 0 0

STEP 8

| Nb of Msg | 0 | 0 | 1 | 2 | 0 | 0 |
|---|---|---|---|---|---|---|
| Stat.Ni | . | . | . | . | . | . |
| Crit.Ni | 3 | . | 2 | . | . | . |
| Cur.Ni | 1 | 0 | 2 | 0 | 0 | 0 |
| DelMaxi | . | . | →3 | . | . | . |
| Dorm.i | 0 | . | →3 | 2 | . | . |

HDW_ST: 0 0 1 1 0 0    WGH_ST: 1 0 1 0 0 0
ACT_ST: 0 0 1 0 0 0

STEP 9

| Nb of Msg | 0 | 0 | 0 | 2 | 0 | 0 |
|---|---|---|---|---|---|---|
| Stat.Ni | . | . | . | . | . | . |
| Crit.Ni | 3 | . | 2 | . | . | . |
| Cur.Ni | 1 | 0 | 1 | 0 | 0 | 0 |
| DelMaxi | . | . | . | . | . | . |
| Dorm.i | 0 | . | 0 | 3 | . | . |

HDW_ST: 0 0 0 1 0 0    WGH_ST: 1 0 1 0 0 0
ACT_ST: 0 0 0 0 0 0

STEP 10

| Nb of Msg | 0 | 0 | 0 | 1 | 0 | 0 |
|---|---|---|---|---|---|---|
| Stat.Ni | . | . | . | . | . | . |
| Crit.Ni | . | . | . | . | . | . |
| Cur.Ni | 0 | 4 | 0 | 2 | 1 | 2 |
| DelMaxi | . | . | . | . | . | . |
| Dorm.i | 0 | . | 0 | . | . | . |

HDW_ST: 0 0 0 1 0 0    WGH_ST: 0 1 0 1 1 1
ACT_ST: 0 0 0 1 0 0

STEP 11

| Nb of Msg | 0 | 0 | 0 | 0 | 0 | 0 |
|---|---|---|---|---|---|---|
| Stat.Ni | . | . | . | . | . | . |
| Crit.Ni | . | . | . | . | . | . |
| Cur.Ni | 0 | 4 | 0 | 1 | 1 | 2 |
| DelMaxi | . | . | . | . | . | . |
| Dorm.i | 0 | . | 0 | . | . | . |

HDW_ST: 0 0 0 0 0 0    WGH_ST: 0 1 0 1 1 1
ACT_ST: 0 0 0 0 0 0

METHOD AND SYSTEM FOR SCHEDULING QUEUED MESSAGES BASED ON QUEUE DELAY AND QUEUE PRIORITY

FIELD OF THE INVENTION

The present invention relates to data processing in a multitasking operating computer system and more particularly to a method and a system for controlling data transfer between a host data processing system and communication networks by processing queued messages according to a combination of time and weight criteria.

BACKGROUND OF THE INVENTION

Operating systems that use single tasking have existed on host data processing systems for many years. In such systems, the operating system executes computer programs, subroutines or tasks serially. Before beginning a new task, the previous one must be completed. The waiting delay may last for a certain period and the throughput of the operating system may be impacted. Thus, the system may break down.

This problem has led to the advent of the multitasking or multi thread operating systems in which each computer program or task is divided into a plurality of tasks or streams of execution. Furthermore, multitasking operating systems have also been extended to multiprocessor environments where tasks of the same or different programs can be executed in parallel on different computer processors. While such multitasking operating systems optimize the use of one or more processors, they do not permit the application program developer to adequately influence the scheduling of the task executions.

There are different mechanisms for processing the set of queues in which the tasks are queued. Such mechanisms are based on three main basic principles:

- the principle based on priority: wherein a set of priorities is assigned to the different queues and the queue with highest priority is served as long as it is not empty. In such case, the queues with lower priorities might never be served because of the important traffic on higher priority queues;
- the principle based on a predefined processing sequence: wherein an order for processing of queues is defined according to a priority that is defined by repetition of a queue in the sequence. Whatever the status of the queues are, the sequence is executed (high priority is defined by a high number of occurrences of a given queue in the sequence); and
- the principle based on time: wherein each queue is assigned a processing time. The queue is to be processed when the corresponding processing time has elapsed. In this case, the queue priority is defined according to the value of the corresponding processing time (the higher the priority of the queue is, the lower the relevant processing time should be).

In any one of these mechanisms which are to some extent static, the queue evolution and aging are not taken into consideration. In order to cope with the data traffic and not to impact on the throughput of the queue processing, it is required to implement a mechanism that is based on criteria which may have static requirements but which may also evolve in real time so as to process within acceptable delays all the messages in the queues, even the ones with the lowest priorities.

In U.S. Pat. No. 5,630,128, a controlled scheduling of program threads in a multitasking operating system is disclosed. In this technique, a multitasking operating system permits application programs to influence a schedule of execution of programs to which are assigned priority levels and dispatch classes in which the threads reside. According to these parameters, the operating system queues the highest priority thread which is available for execution from each dispatch class onto a run list for execution by a processor. The highest priority thread on the run list is executed first. But in this kind of implementation, there is no guarantee that the lowest priority thread can be processed within an acceptable delay unless no higher priority thread remains on the run list.

In another U.S. Pat. No. 5,437,032, a task scheduler for a multiprocessor system, each containing one or more processors, concurrently execute tasks into which jobs as database queries are divided. Each job is assigned a weight in accordance with the external priority of the job. A desired level of concurrent task activity is defined for each of the jobs. The actual level of concurrent task activity for each of the jobs is also determined. The jobs are prioritized for execution of awaiting tasks in accordance with the discrepancy between the desired level of concurrent task activity and the actual level of concurrent task activity for each of the jobs. This technique is based on the definitions of desired and actual levels and does take into account the time constraint wherein a task or a set of tasks are to be executed within a certain delay.

In U.S. Pat. No. 5,247,671, scalable schedules for a serial communications controller in a data processing system is disclosed. In this document, the tasks are scheduled at different priority level so that time-critical tasks are performed quickly enough to prevent data loss. The notion of time-critical in this patent came directly from the notion of priority. Both notions are not independent, meaning that the tasks are arranged according to certain priority and in this arrangement, some or all the tasks might have time-critical values.

SUMMARY OF THE INVENTION

It is therefore an object of the present invention to provide a method and a system for use in data processing in a computer system where the tasks or messages that are queued might have both an associated priority and a time-critical delay.

It is also an object of the invention to have an implementation wherein the prioritizing of queues and messages should not deteriorate the time responses of messages of the lowest priorities.

It is another object of the present invention to be applicable to any software managed system where the users share a single resource.

Accordingly, the queues are processed according to two criteria that are the static priority requirements of the queues and its acceptable aging. The queue processing is then based on a time and weight dependent mechanism.

Therefore, according to the present invention, a method for controlling data transfer between a host data processing system and communication networks by processing queued messages of a plurality of queues (MIQ) saved in a data store comprises the steps of:

(a) dequeueing, in normal state, successively queued messages from a plurality of queues (MIQ) according to their queue priorities;

(b) interrupting this normal state to enter a critical state, by dequeueing successively queued messages from a plurality of critical queues (MIQ) according to their queue priorities, the critical queues having aging times that exceed predetermined values (Delay.Maxi); and (c) returning to the previous normal state with its set of parameters to continue until the next critical state occurs or until the end of the scheduling cycle.

According to the present invention, a system is provided for controlling data transfer between a host data processing system and communication networks by processing queued messages of a plurality of queues (MIQ) saved in a data store, wherein each MIQ is associated with at least four registers:

a first register for static weight (Stat.Ni) corresponding to the number of messages which may be pulled out from the queue, the first register being implemented in connection with a second register for current weight (Cur.Ni) corresponding to the number of messages left that are allowed to be dequeued from the queue, for processing queued messages in normal state; and a third register for maximum delay (Delay.Maxi) corresponding to the maximum waiting time of a non-empty MIQ to be dequeued, the third register being implemented in connection with a fourth register for dormant time (Dorm.i) corresponding to the elapsed time since the MIQ was last served, for processing queued messages in critical state when the fourth register exceeds the third register.

DETAILED DESCRIPTION OF THE PREFERRED EMBODIMENT

Figure 1:
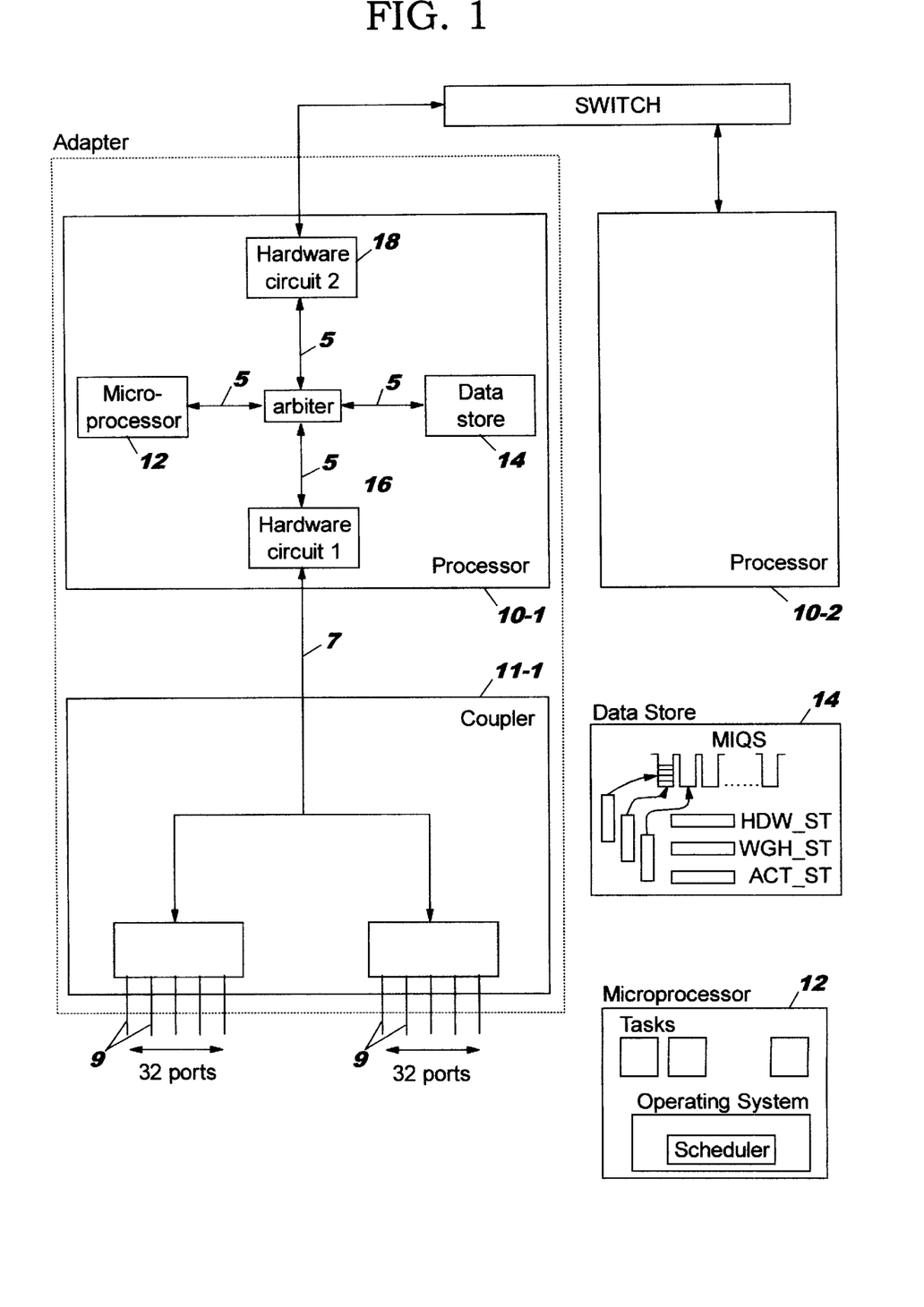
FIG. 1 shows a block diagram of the computer system in which a preferred embodiment of the present invention is implemented.

The description corresponds to the case of an implementation within a telecommunication environment. This environment comprises a connectivity switch 1 and a set of communication adapters 10-1 and 11- 1 to 10-N and 11-N.

Each telecommunication adapter 10-1 and 11-1 includes a processor card 10-1 and a coupler card 11-1 connected to a plurality of networks through a 32-port bus 9. The processor card contains a microprocessor 12 for instance Intel 486, a data store 14 and two hardware circuits 16,18. The functionalities of both hardware circuits are to interface the data store 14 and to connect either the coupler or the switch. High performance processing bus (HPPB) 3,7 interconnects the switch 1 and the coupler 11-1 to the processor 10-1.

The microprocessor 12 also includes software composed of a multitasking operating system using a scheduler 13 and the tasks to be executed.

The processor 10-1 operates as follow:

Upon reception from the hardware circuit 16, the messages from the network 9 are stored in a set of queues of the data store 14. These queues are also called Microcode Input Queues (MIQ). A hardware service table is also updated by the hardware circuit 16. This table indicates the status of each queue (empty or not empty);

The software, by scanning the service table in polling mode, is informed of the status of the queues which indicate if a message is received. Then the messages are pulled out of the MIQs so as to be handled by the corresponding tasks;

Concerning the reception from the hardware circuit 18, the same processing steps occur.

The transmission of data messages operates as in common processing operations, which is not the object of the present invention and thus it will not be described.

The coupler 11-1 receives data messages containing bits from the 32-port bus 9. The coupler reassemble the entire data messages so as to transmit them to the processor 10-1 through the hardware circuit 16 so that the data messages are queued in the correct MIQ. Not only does the coupler receive the set of bits but it also generates event messages that are processed in the same manner as data messages. The event messages and the data messages may have different priority levels.

The number of MIQs in this implementation is limited to a total of 16, but it may be increased to any value as long as the MIQs are ordered in decreasing priority level.

The coupler 11-1 is responsible for the mapping between message priority and MIQ priority.

In the preferred embodiment, the present invention may be implemented in a MIQ scheduler part of the operating system.

Figure 2:
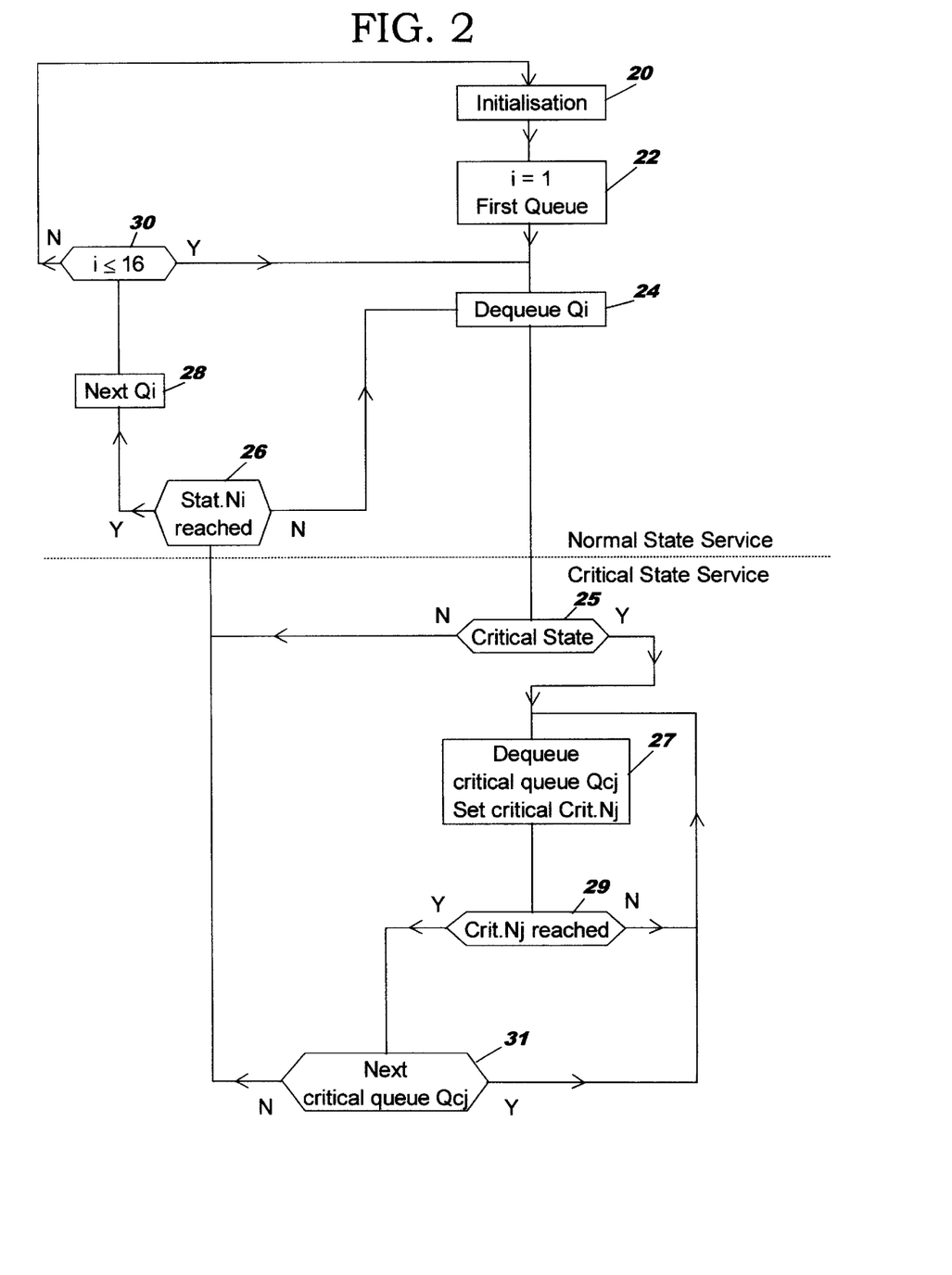
FIG. 2 shows the major steps of the method according to the present invention.

FIG. 2 shows the principal steps of the method according to the present invention.

Each MIQ is associated with a set of parameters:

a static weight, referred to as Stat.Ni, corresponds to the number of messages which may be pulled out from the queue before processing a less prioritized queue, a current weight, referred to as Cur.Ni, is the variable that determines the current number of remaining messages that is allowed to be dequeued from the MIQ, this number decreases from the static weight to 1;

a critical weight, referred to as Crit.Ni, corresponds to the number of messages which may be pulled out from the queue before processing a less prioritized queue, when the MIQ enters in the critical state to be defined later on;

a maximum delay, referred to as Delay.Maxi, is the maximum time a non-empty MIQ may wait before being served again, in normal state;

a dormant time, referred to as Dormant.i, is the elapsed time since the non-empty MIQ was last served.

The purpose of this chart is to clearly distinguish the normal state from the critical state. In the normal state, the queues are served according to their predetermined level of priority. In the critical state, all the queues that are in critical state are served according to their predetermined critical level of priority which may be different from the one in normal state. The critical state is maintained as long as there is a queue in critical state. The main steps of the method are the following:

At power on, the scheduler initializes the set of parameters mentioned above for each queue MIQ, at step 20.

The scheduler enters an infinite loop consisting of dequeueing the highest priority non-empty MIQ, which is for instance the first queue if the MIQs are ordered in a decreasing priority order. If the priority order is increasing then the last queue is served first and so on.

Thus, at steps 22,24, the first queue Q1 is served, for instance. If there is no critical queue at step 25, the critical state is not entered. The static weight is then tested to determine if there is still a message to be pulled out from the corresponding MIQ at step 26. By looping to step 24, the messages are dequeued from the same MIQ until Stat.Ni is reached (or until Cur.Ni is down to 0).

In the latter case, the next MIQ is served at steps 28,30,24, and so on until the queue of the least priority level is served at step 30. This is thus the end of the so-called scheduling cycle. Then, the scheduler returns back to the initialization at step 20, where the entire set of queues are initialized with the above mentioned set of parameters.

In this preferred implementation, the number of queues is 16, but one may use as many queues as are required by the specific implementation.

In case the critical phase is entered at step 25, meaning that the maximum aging of one or more queues is reached (the dormant time of the corresponding MIQ is above the maximum delay of that MIQ), the state of this normal state is stored for future come back and the MIQs in critical state are dequeued according to their corresponding critical weight Crit.Ni, at step 27.

The critical queues are dequeued one by one according to their Crit.Ni until the corresponding critical weights are reached, at steps 29,31. If other MIQs appear to be critical, they are served in the order of their critical priorities (or weights). If no critical MIQ is left, the scheduler exits from this critical state and loops back to the normal state that it previously quit at step 26. Then the normal state continues until the next critical state occurs.

Figure 3:
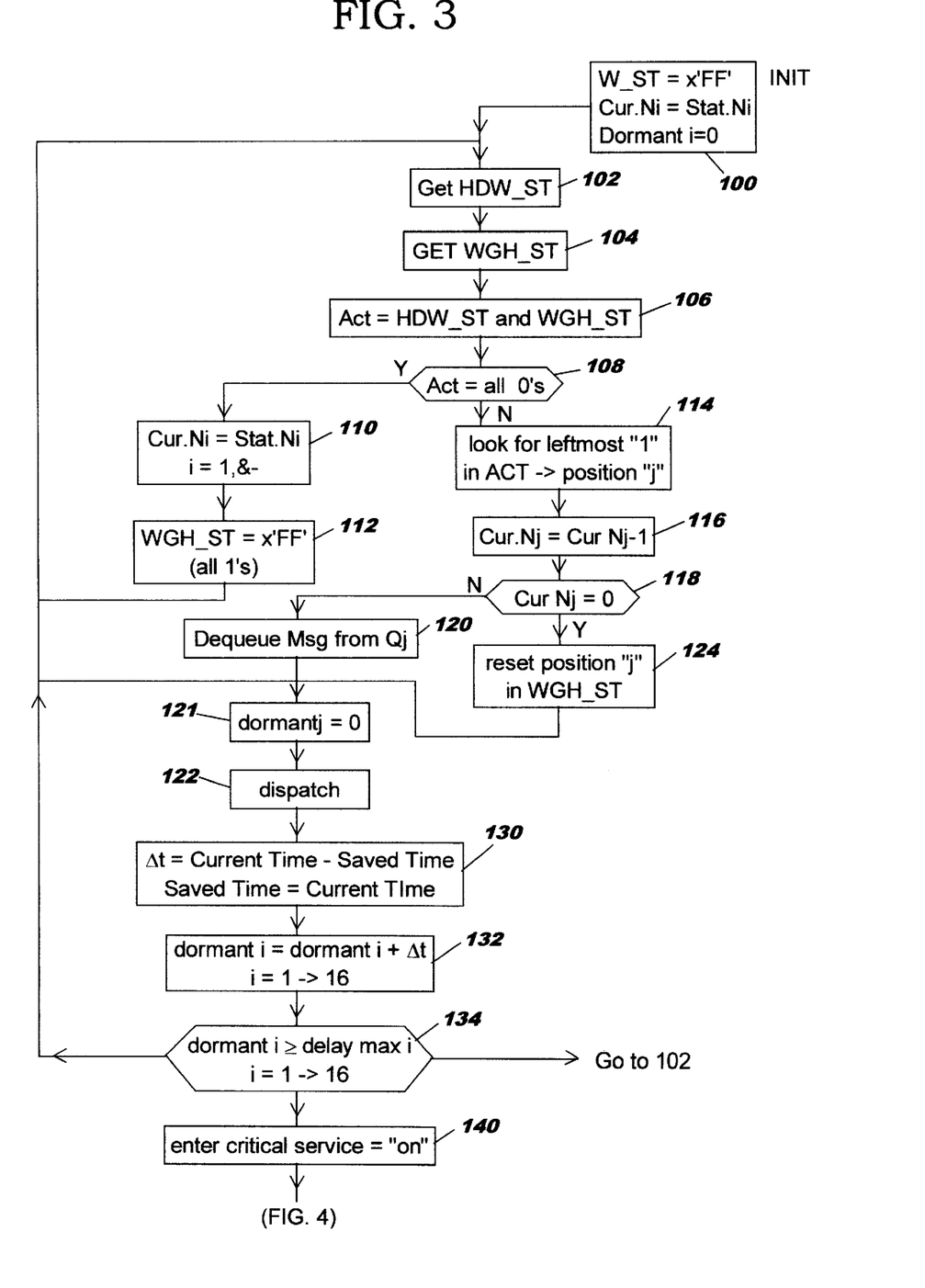
FIG. 3 shows in detail a flow chart illustrating the method according to the present invention in normal state.

FIG. 3 shows in detail a flow chart illustrating the method according to the present invention in normal state.

The scheduler and the hardware share the hardware service table (HDW_ST). This service table is a table of bits, each bit representing the status of a MIQ:

each time a MIQ goes from empty to not empty, hardware circuit 16 or hardware circuit 18 sets the corresponding bit to 1 in the service table;

each time a MIQ goes from not empty to empty, the hardware circuit which is in fact responsible for the message dequeue from the MIQ (on the scheduler request) resets the corresponding bit in the service table HDW_ST.

The scheduler maintains two other software service tables:

a weight service table (WGH_ST), which indicates, for each priority x, if the MIQ is to be served or not. The corresponding bit is set to 1 at system start-up and after each scheduling cycle. The corresponding bit is set to 0 when Stat.Ni messages have been dequeued from MIQi (that is Cur.Ni is equal to 0); and an active service table (ACT_ST) which is the result of the 'AND' operation between the HDW_ST and WGH_ST.

In the initialization step 100, the WGH_ST is set to all 1's, and for each MIQ the Cur.Ni is set to STAT.Ni.

After initialization 100, the scheduler enters its scheduling cycle. The first operation is to get the HDW_ST and the WGH_ST from the data store at steps 102,104. Then, the AND operation is performed between the two tables and the result is stored in the ACT table, at step 106. If the result is all 0's, which means that a scheduling cycle is completed, the initialization operations 110,112 mentioned above are performed and a new scheduling cycle starts.

Otherwise, the scheduler looks for the left most '1' in ACT_ST, at step 114, which corresponds to the highest priority MIQ to be dequeued now, for instance the position j. Then, the Cur.Nj is decreased, at step 116. If Cur.Nj is equal to 0, at step 118, which means that the allowed number of messages to be dequeued is reached for this MIQ, the corresponding bit in the WGH_ST is reset to 0, at step 124. And a new scheduling cycle is started at step 102. Otherwise, at step 120, the message is dequeued from MIQJ.

By referring to FIG. 3, the dormant time for MIQJ is reset, at step 121. And the corresponding task is dispatched to handle the just dequeued message at step 122.

The elapsed time is computed by subtracting from the current time the previously saved time corresponding to the last dequeued message, at step 130. Meanwhile, the current time is saved for the computation of the next elapsed time.

For each MIQ except MIQj, the dormant time is increased by the just computed elapsed time at step 132.

If none of the Dormant.i exceeds the Delay.maxi, the scheduler remains in the normal service mode and loops back to step 102. A new scheduling cycle is then started. Otherwise, the scheduler enters a critical service mode at step 140.

Figure 4:
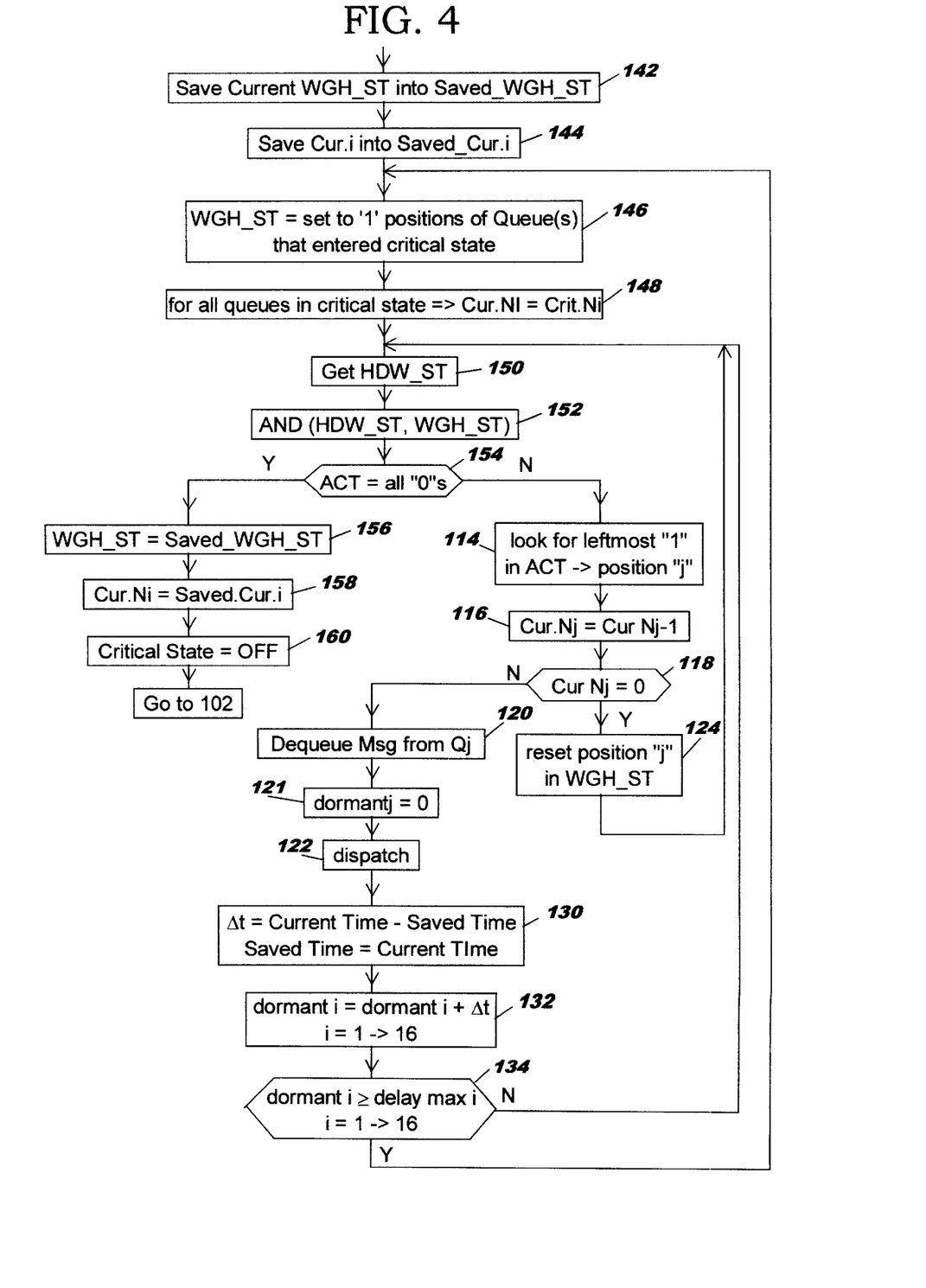
FIG. 4 shows in detail a flow chart illustrating the method according to the present invention in critical state.

FIG. 4 shows in detail a flow chart illustrating the method according to the present invention in critical state.

During critical service mode, only queues having entered into critical state are processed.

The scheduler saves the normal state context that is WGH_ST and all the Cur.Ni, in order to return after processing this critical state.

A New WGH_ST is built by setting to 1 all positions of the MIQs in critical states, at step 146. At the same time, for all the queues in critical state, the current Ni are set to Crit.Ni at step 148.

Then, the next operation 150 is to get the HDW_ST and WGH_ST tables from the data store 102. The AND operation is performed between the two tables and the result is stored in the ACT table, at step 152. If the result is all 0's, at step 154, which means that the critical state has been completed, the normal state has to be recovered. The previously saved WGH_ST and the Cur.Ni are retrieved, at steps 156,158. The scheduler exits the critical state at step 160 and a new scheduling cycle starts in normal state, at step 102.

Otherwise, at step 114 the scheduler looks for the left most '1' in the ACT_ST table, which corresponds to the highest priority MIQ to be dequeued now, for instance the position j.

Then, the Cur.Nj is decreased at step 116. If the Cur.Nj is equal to 0 at step 118, which means that the allowed number of messages to be dequeued is reached for this MIQ, the corresponding bit in the WGH_ST table is reset to 0, at step 124. A new scheduling cycle in critical state is started and the scheduler loops back to step 150.

Otherwise, at step 120, the message is dequeued from the critical MIQj. Then, the dormant time for MIQj is reset at step 121. And the corresponding task is dispatched to handle the just dequeued message at step 122.

The elapsed time is computed by subtracting from the current time the previously saved time corresponding to the previously dequeued message at step 130. Meanwhile, the current time is saved for the computation of the next elapsed time.

For each MIQ except MIQj, the dormant time is increased by the just computed elapsed time at step 132. Then, at step 134, if none of the Dormant.i exceeds the Delay.maxi, which means that no new MIQ has entered in critical state, a new scheduling cycle in critical state is started and the scheduler loops to step 150.

Otherwise, which means that a new queue enters a critical state, a new WGH_ST is built by setting to 1 all positions of the MIQs in critical states by looping back to step 146.

Figure 5A:
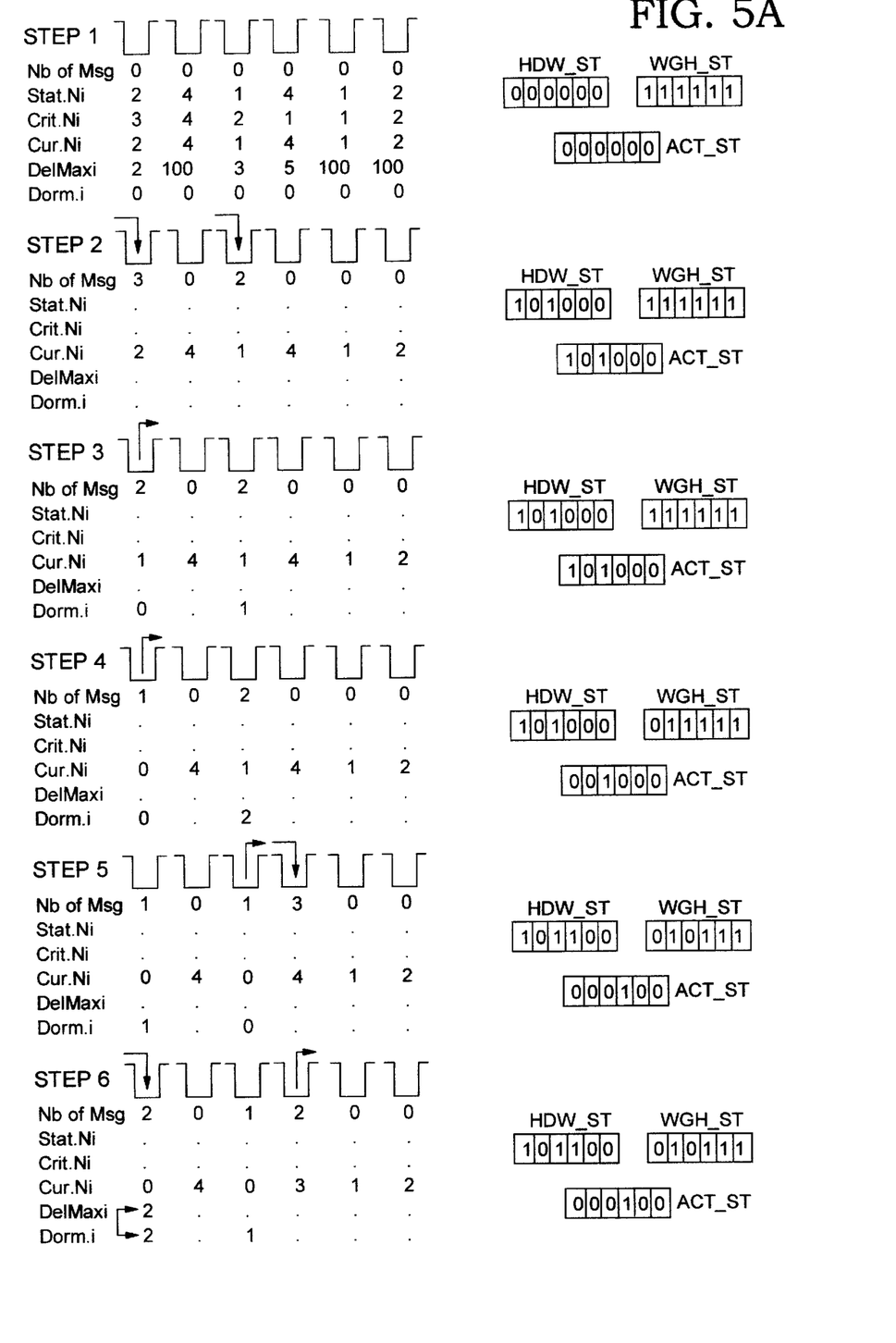
FIGS. 5A–5B illustrate an example of an application of the present invention.
Figure 5B:
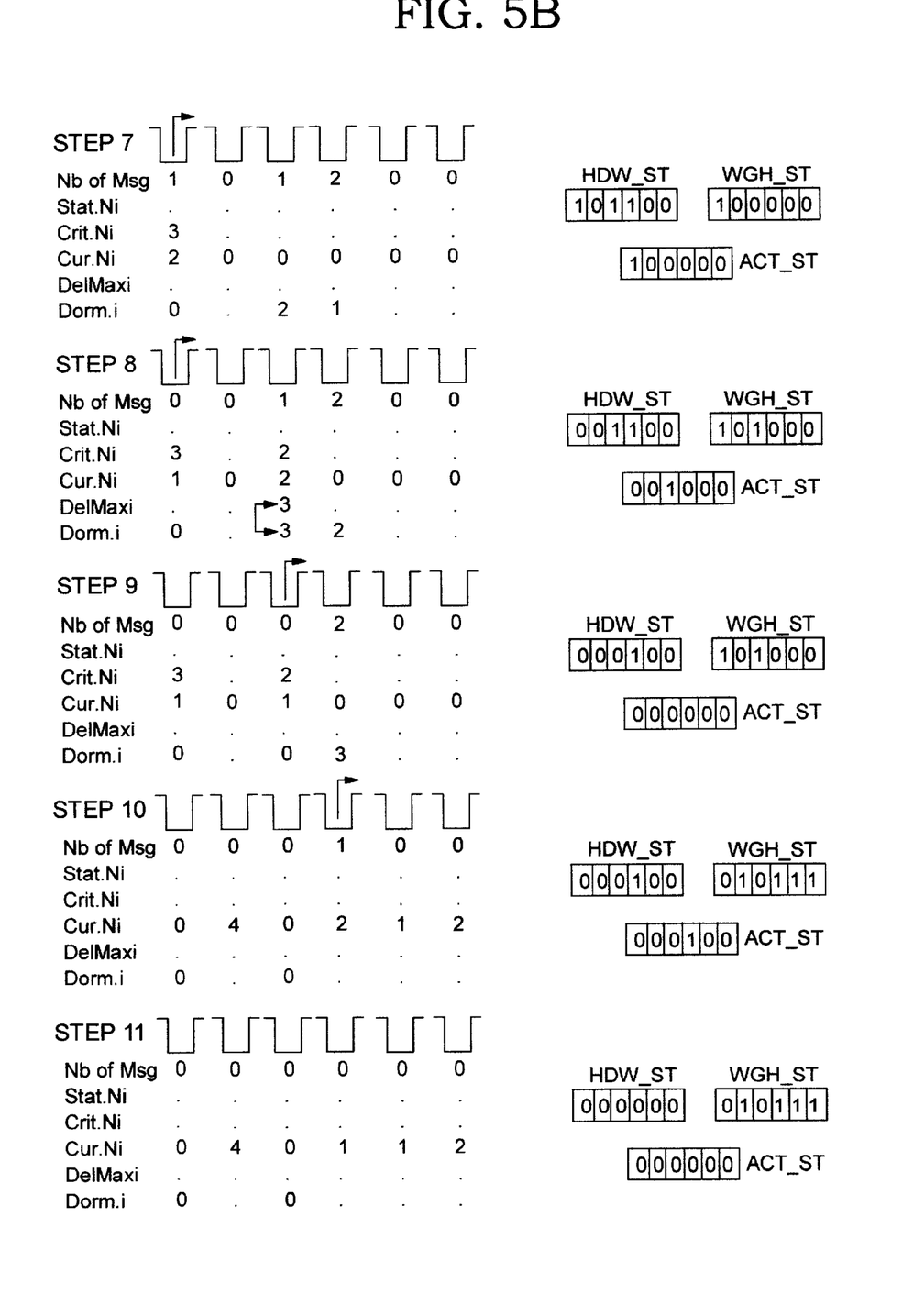

FIGS. 5A and 5B illustrate the process of the invention in different steps of an example which is based on 6 MIQs associated with their corresponding sets of parameters. The status of HDW_ST, WGH_ST and ACT_ST tables are also shown.

Step 1: is the initialization state, where all the MIQs are empty. A set of initial weights are assigned to each MIQ. The current weights are equal to static ones. The status of the HDW_ST, WGH_ST and ACT_ST are also initialized.

Step 2: three messages have been queued by the circuit hardware 16 in MIQ (1) and two messages in MIQ (3). Thus the HDW_ST is updated by setting the first and third bits to 1, which modifies at the same time the value of the first and the third bits of the ACT_ST. The WGH_ST remains unchanged.

Step 3: the scheduler dequeues the first message from MIQ (1) because the ACT_ST has its first bit set to 1, meaning that the highest priority non-empty queue is to be dequeued. The current weight for MIQ (1), Cur.N1, is decremented, at the same time the dormant time, dorm.1, is reset while the dorm.3 time is increased by the elapsed time, which is in this example 1 unit.

Step 4: the scheduler dequeues the second message from MIQ (1) because ACT_ST has its first bit set to 1, meaning that the highest priority non-empty queue is still to be dequeued. The current weight for MIQ (1), Cur.N1, is decremented and reaches the value 0, then the first bit of WGH_ST is reset to 0. At the same time, the dormant time dorm.1 is reset while dorm.3 is increased by the elapsed time, which is in this example 1 unit. Thus, ACT_ST now has only the third bit set to 1.

Step 5: by reading the ACT_ST, the scheduler dequeues the first message from MIQ (3) because the ACT_ST has its third bit set to 1. The current weight for MIQ (3), Cur.N3, is decremented and reaches the value 0, then the third bit of WGH_ST is reset to 0. At the same time the dormant time dorm.3 is reset while the dorm.1 time is increased by the elapsed time, which is in this example 1unit. Meanwhile, three messages have been queued in the MIQ (4), which sets the fourth bit of HDW_ST to 1. Thus, ACT_ST now has only the fourth bit set to 1.

Step 6: by reading the ACT_ST, the scheduler dequeues the first message from MIQ (4) because the ACT_ST has its fourth bit set to 1. The current weight for MIQ (4), Cur.N4, is decremented. At the same time, the dormant time, dorm.4, is reset while the dorm.1 and dorm.3 times are increased by the elapsed time. Meanwhile, one message has been queued in the MIQ (1), the first bit of HDW_ST remains at 1 since previously there was one message left. Since the dorm.1 time has reached the maximum delay, this MIQ enters into critical state. It should be kept in mind that MIQ (1) as being on the left most side is the highest priority queue.

Step 7: is the initialization of the critical state. A set of initial critical weights is assigned to each critical MIQ, for instance MIQ (1). The current weights are equal to critical static ones. The status of the HDW_ST remains unchanged, but the status of WGH_ST is initialized based on the MIQs in critical state. ACT_ST is updated accordingly. During this step, the scheduler dequeues the first message from MIQ (1) because the ACT_ST has its first bit set to 1, meaning that the highest priority non-empty critical queue is to be dequeued. The current weight for MIQ (1), Cur.N1, is decremented, at the same time the dormant time, dorm.1, is reset while the dorm.3 and dorm.4 times are increased by the elapsed time, which is in this example 1 unit.

Step 8: the scheduler still dequeues the next message from MIQ (1) because the ACT_ST has its first bit set to 1. The current weight for MIQ (1), Cur.N1, is decremented, at the same time the dormant time, dorm.1, is reset while the dorm.3 and dorm.4 times are increased by the elapsed time. No more message are left in MIQ (1). Thus the first bit of HDW_ST is reset to 0. Since the dorm.3 time has reached the maximum delay, this MIQ enters in critical state. Thus the third bit of WGH_ST is set to 1, which modifies the third bit of ACT_ST while its first bit is reset.

Step 9: the scheduler still dequeues the next message from MIQ (3) because the ACT_ST has its third bit set to 1. The current weight for MIQ (3), Cur.N3, is decremented, the dorm.3 time is reset while dorm.4 time is increased by the elapsed time. No more messages are left in MIQ (3). Thus, the third bit of HDW_ST is reset to 0. Since ACT_ST has all its bits reset, the critical state ends. The scheduler returns to its previous normal state.

Step 10: The current weights are re-initialized to the values saved before entering the critical state. The status of the HDW_ST remains unchanged, but the status of WGH_ST is reinitialized to the values saved before entering the critical state. ACT_ST is updated accordingly, meaning that only the fourth bit is set to 1.

By reading ACT_ST, the scheduler dequeues the first message from MIQ (4) because the ACT_ST has its fourth bit set to 1. The current weight for MIQ (4), Cur.N4, is decremented. At the same time, the dormant time, dorm.4, is reset.

Step 11: By reading ACT_ST, the scheduler dequeues the next message from MIQ (4) because the ACT_ST still has its fourth bit set to 1. The current weight for MIQ (4), Cur.N4, is decremented. No message is left in MIQ (4) even though the current weight does not reach the value 0 yet. The fourth bit in the HDW_ST is reset. Thus, all its bits are reset to 0. Thus ACT_ST is reset accordingly to 0. The end of the scheduling cycle is reached even though WGH_ST does not have all of its bits reset. Henceforth, the next step of the process will be step 1.

What is claimed is:

1. A method for controlling data transfer between a host data processing system and a communication network by processing queued messages in a plurality of queues saved in a data store, said method comprising the steps of:
  (a) including in the data store a first service table (ACT_ST) containing a plurality of bits wherein each bit is associated with a corresponding queue so as to determine which queue has to be served, said first service table being stored before entering a critical state and updated according to the critical queues and being the result of an AND operation between two other service tables contained in the data store, specifically:
     a second service table (HDW_ST) containing a plurality of bits, each bit corresponding to the status of a queue so as to determine if a new message has been enqueued in said queue; and
     a third service table (WGH_ST) containing a plurality of bits, each bit associated with a corresponding queue so as to determine if said queue is to be served according to the associated predetermined number of allowed dequeue messages;
  (b) dequeueing, in a normal state, successively queued messages from a plurality of queues according to their associated queue priorities;
  (c) dequeueing in the normal state, in the order of queue priorities, queued messages from non-empty queues until their associated predetermined number of allowed dequeue messages are reached;
  (d) interrupting the normal state to enter a critical state, by dequeueing successively queued messages from a plurality of critical queues according to their associated queue priorities, said critical queues having their corresponding aging times exceed predetermined values;

(e) dequeueing in the critical state, in the order of critical queue priorities, queued messages from non-empty critical queues until their associated predetermined critical number of allowed dequeue messages are reached; and (f) returning to the previous normal state with its set of parameters to continue until the next critical state occurs or until the end of scheduling cycle is reached.

2. The method of claim 1 wherein step (a) comprises the steps of:

reading said service tables HDW_ST, WGH_ST and ACT_ST;

selecting a left most '1' in said first service table to dequeue messages from the corresponding queue until the associated predetermined number of allowed dequeue messages is reached;

computing the elapsed time since the previous processing of said selected queue in order to determine if its corresponding aging time exceeds a predetermined value; and dequeueing a next non-empty queue in the normal state according to its corresponding status bit in said first service table.

3. The method of claim 1 wherein step (b) comprises the steps of:

saving a current normal state set of parameters;

setting in said third service table (WGH_ST) bits that correspond to queues in the critical state;

computing bits in a first critical service table (ACT_ST) corresponding to said critical state;

selecting a left most '1' in said first service table to dequeue message from the corresponding critical queue until the associated predetermined number of allowed dequeue messages is reached;

computing the elapsed time since the previous processing of said selected queue in order to determine if its corresponding aging time exceeds a predetermined value; and dequeueing a next non-empty critical queue according to its corresponding status bit in said first service table (ACT_ST).

4. A system for controlling data transfer between a host data processing system and a communication network by processing queued messages in a plurality of queues saved in a data store, said system comprising:

a first service table (ACT_ST) saved in the data store and containing a plurality of bits wherein each bit is associated with a queue so as to determine which queue has to be served, said service table being stored before entering a critical state and updated according to the critical queues; said first service table (ACT_ST) being the result of an AND operation between two other service tables contained in the data store, specifically;

a second service table (HDW_ST) containing a plurality of bits, each bit corresponding to the status of a queue so as to determine if a new message has been enqueued in said queue; and a third service table (WGH_ST) containing a plurality of bits, each bit associated with a corresponding queue so as to determine if said queue is to be served according to the associated predetermined number of allowed dequeue messages;

a plurality of registers that are associated with each queue including:

a first register for a static weight corresponding to a number of messages which may be pulled out from said queue, said register being implemented in connection with a second register for a current weight corresponding to a number of messages allowed to be dequeued from said queue, for processing said queued messages in a normal state;

a third register for a maximum delay corresponding to a maximum waiting time of a non-empty queue to be dequeued, said register being implemented in connection with a fourth register for a dormant time corresponding to an elapsed time since said queue was last served, for processing queued messages in a critical state when the contents of said fourth register exceeds the contents of said third register; and a fifth register processing queued message of a critical queue for critical weight corresponding to a number of messages allowed to be dequeued from said critical queue, in a critical state.

* * * * *